(12) United States Patent
Maruyama et al.

(10) Patent No.: US 8,675,064 B2
(45) Date of Patent: Mar. 18, 2014

(54) DISPLAY SYSTEM

(75) Inventors: Kiyoyasu Maruyama, Tokyo (JP);
Chihiro Morita, Tokyo (JP); Tomohiro Hattori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 932 days.

(21) Appl. No.: 12/507,625

(22) Filed: Jul. 22, 2009

(65) Prior Publication Data

US 2010/0020174 A1    Jan. 28, 2010

(30) Foreign Application Priority Data

Jul. 23, 2008  (JP) ................................. 2008-189682

(51) Int. Cl.
*H04N 7/18* (2006.01)
*H04N 5/228* (2006.01)
*B60Q 1/48* (2006.01)
*G08G 1/14* (2006.01)
*G09G 5/00* (2006.01)

(52) U.S. Cl.
USPC ... 348/143; 348/208.16; 348/148; 340/932.2; 345/629

(58) Field of Classification Search
USPC ........................................................ 348/143
See application file for complete search history.

(56) References Cited

U.S. PATENT DOCUMENTS

| | | | | |
|---|---|---|---|---|
| 5,572,252 | A * | 11/1996 | Naka et al. | 348/208.16 |
| 6,002,797 | A | 12/1999 | Mori et al. | |
| 6,067,092 | A * | 5/2000 | Rinaldi et al. | 345/629 |
| 6,816,085 | B1 * | 11/2004 | Haynes et al. | 340/932.2 |
| 2004/0233284 | A1 * | 11/2004 | Lesesky et al. | 348/148 |

FOREIGN PATENT DOCUMENTS

| | | |
|---|---|---|
| JP | 07-162751 A | 6/1995 |
| JP | 2006-229781   * | 8/2006 |
| JP | 2006-229781 A | 8/2006 |

* cited by examiner

*Primary Examiner* — Christopher S Kelley
*Assistant Examiner* — Hee-Yong Kim
(74) *Attorney, Agent, or Firm* — Birch, Stewart, Kolasch & Birch, LLP

(57) ABSTRACT

A display system is provided which determines an effective image area by automatically detecting a boundary between the effective image area and a non-image area created owing to the difference between the pixel numbers of the camera image sensor and television signal, to thereby display the images on a monitor by adjusting a display size and position suitable for the effective image area, whereby an inappropriate display size and position are avoided from being set while a lighting device for illuminating a camera's field of vision is off. The display system receives a signal notifying about activation of the lighting device from the lighting controller that provides on/off control of the device; the system then determines the effective image area if the device is on, and does not if it is off.

13 Claims, 15 Drawing Sheets

FIG.4

| Starting address | | |
|---|---|---|
| | 0x0000 | Data at coordinates (0, 0) ~ 251 |
| | 0x0000 | Data at coordinates (1, 0) ~ 252 |
| | ⋮ | ⋮ |
| | 0x0000 | Data at coordinates (719, 0) ~ 253 |
| | 0x0000 | Data at coordinates (0, 1) ~ 254 |
| | ⋮ | ⋮ |
| | 0x0000 | Data at coordinates (719, 0) ~ 255 |
| | 0x0000 | Data at coordinates (0, 2) ~ 256 |
| | 0x0000 | Data at coordinates (1, 2) ~ 257 |
| | 0x5F3D | Data at coordinates (2, 2) ~ 258 |
| | ⋮ | ⋮ |

DISPLAY SYSTEM

FIELD OF THE INVENTION

The present invention relates to a display system that, in displaying on a display monitor an image taken by a camera device, detects an area effective as an image that is displayed on the monitor, to display only the image of the effective area. In particular, the invention relates to a display system that displays an image taken by a security monitoring camera device in an elevator car.

BACKGROUND OF THE INVENTION

With an increasing awareness of safety and security among people today, even in an elevator system, images taken by a security monitoring camera device (hereinafter also called monitoring camera device) mounted within the elevator car are commonly monitored and recorded in a building management/security office, or a security company. Furthermore, a simple security system is widely used which helps ensure the security, with the user privacy being protected, by displaying an image within the car for only several seconds on a display monitor (hereinafter also called monitor) installed in the elevator car or at an elevator hall.

When the camera device is connected to the monitor on which a camera image is displayed, a television signal (a signal based on a broadcast standard such as NTSC or PAL) is generally used in order to connect both units at lower cost. For that reason, before being output from the camera device, camera images captured by an image sensor are converted within the camera device into the television signal.

When the images are converted into the television signal, the number of pixels of the image sensor for the camera device differs in some situations from that of the television signal. To deal with this, image processing such as trimming and scaling up or down (enlargement or reduction) is implemented. In particular, when the pixel number of the television signal is greater than that of the camera image sensor, a non-image area (black image) is in some cases provided at or near the perimeter of the display screen.

In this case, however, a problem is that when the monitor for receiving the television signal to display a camera image thereon displays the non-image area (black image) as it is, provided at or near the perimeter of the screen for the television signal, the displayed image is unsightly and there can be no effective use of the monitor screen.

On the other hand, in a television system where received broadcast signals are displayed on the monitor, provision is generally made to allow the non-image area (black image) not to appear on the monitor by selecting a display mode. A method is proposed where when images having the non-image area in an upper and a lower portion thereof or the like are received, a boundary between the non-image area and the effective image area is detected to determine the display mode (refer to Japanese Unexamined Patent Publication No. H7-162751 (page 1, FIG. 1) and Japanese Unexamined Patent Publication No. 2006-229781 (page 1, FIG. 1)).

Conventionally, installation technicians for monitoring camera devices need to visually determine the boundary between an effective image area and a non-image area created resulting from the difference between the pixel number of the camera image sensor and that of the television signal, and then to manually make adjustments of an image display size and display position.

Also, in a system where images taken by the monitoring camera device are displayed, the use of techniques as disclosed in Japanese Unexamined Patent Publications Nos. H7-162751 and 2006-229781 enables a boundary to be automatically determined and then the display mode to be selected to the one that fits to the boundary. The system using the conventional techniques, however, makes determination when the lighting device for illuminating an area within a camera's field of vision is not turned on and the area therewithin is dark as well, thus resulting in the possibility for the display mode to be set to an inappropriate one. For instance, in a system where images taken by the monitoring camera device in an elevator car or cabin are displayed on a monitor (hereinafter called security camera-based monitoring system, or monitoring system), when the elevator system stays not operational for a predetermined period of time, the lighting device in the elevator car is in some cases turned off for economy of power. In this case, generally, only an emergency lamp with a small quantity of light for illuminating an elevator car control panel is switched on, with the area within the camera's field of vision being nearly pitch dark except for the neighborhood of the control panel illuminated by the lamp. In this situation, if boundary determination is made using the techniques in the previously mentioned Japanese Unexamined Patent Publications, and a display mode suitable to the boundary is selected, then the display mode is selected to display only the neighborhood of the elevator car control panel illuminated by the lamp. As a result, even when a passenger enters the elevator car after manipulation of a control panel in the hall, the monitor keeps displaying images with an inappropriate display mode being selected, as long as the display mode is not reset.

SUMMARY OF THE INVENTION

The present invention is directed to the above-described problems, and an object thereof is to provide a display system that automatically determines an effective image area of a camera image to properly adjust the display size and position, but does not set a monitor-displayed image to an incorrect display size and position, when the lighting device is switched off.

To overcome the above-described disadvantages, the display system according to the present invention determines the effective image area if the lighting device is on, and does not if it is off, by receiving a signal notifying that the lighting device has been turned on from the lighting controller that controls the lighting device illuminating an area within the camera's field of vision.

According to the present invention, a display system can be provided that automatically makes determination of a boundary to which a display size and position are then set, but does not set the display size and position fitting to the boundary while the lighting device is off, thus causing no inappropriate display size and position to be set thereto. These and other objects of the present invention will be better understood by reading the following detailed description in combination with the attached drawings of a preferred embodiment of the invention.

BRIEF DESCRIPTION OF THE DRAWINGS

FIG. 4 is a view illustrating a memory map of memory data that an image capture unit has in a working memory for capture of images, according to Embodiment 1 of the present invention;

DESCRIPTION OF THE PREFERRED EMBODIMENTS

Embodiment 1

Figure 1:
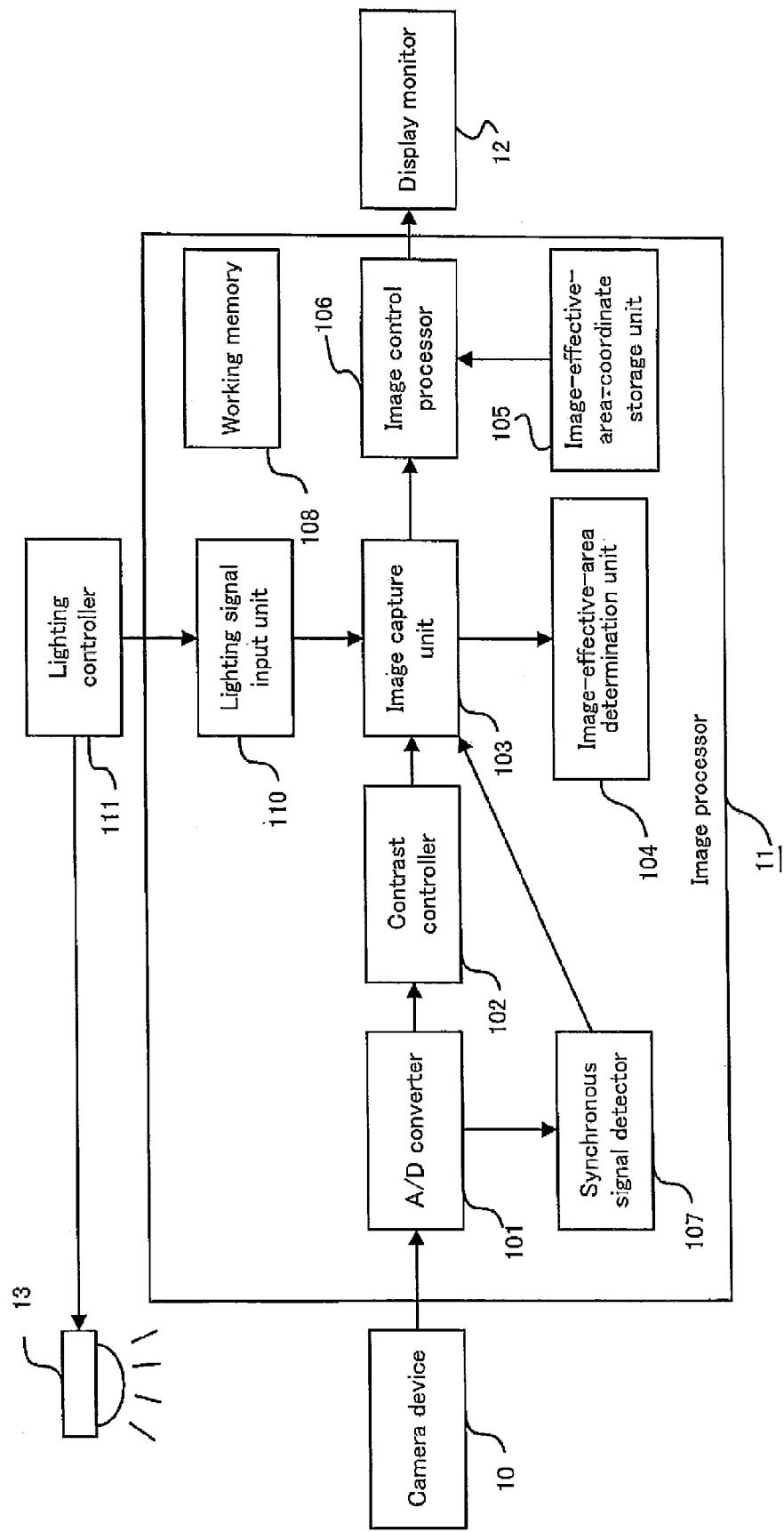
FIG. 1 is a block diagram illustrating a configuration of an elevator security camera-based monitoring system, according to Embodiment 1.

FIG. 1 is a block diagram illustrating an elevator security camera-based monitoring system according to Embodiment 1 of the present invention. The figure shows a monitoring camera device 10; an image processor 11 that receives a television signal (such as an NTSC signal or PAL signal) from the monitoring camera device 10, image-processes the television signal, and then generates a display signal; and a display monitor 12 such as a liquid crystal display monitor that displays a display signal produced by the image processor 11. The figure also shows a lighting device 13 installed within an elevator car where the monitoring camera device 10 is mounted, and a lighting controller 111 that provides on/off control of the lighting device 13. For the camera device 10, a compact, low-cost, and high resolution one can be used owing to widespread use of CCD (charge coupled device) image sensors and CMOS (complementary metal oxide semiconductor) image sensors.

The image processor 11 is configured by an A/D converter 101, a synchronous signal detector 107, a contrast controller 102, and an image capture unit 103. The A/D converter 101 converts television signals delivered from the camera device 10 into digital signals. The synchronous signal detector 107 detects a horizontal synchronous signal and a vertical synchronous signal from the television signals delivered to the A/D converter 101. The contrast controller 102 adjusts contrast of image data produced from the A/D converter 101. The image capture unit 103 captures image data that has been contrast-adjusted by the contrast controller 102, based on the horizontal and vertical synchronous signals detected by the synchronous signal detector 107.

The image processor 11 is also configured by an effective-image-area determination unit 104, an effective-image-area-coordinate storage unit 105, an image control processor 106, a working memory 108, and a lighting signal input unit 110. The effective-image-area determination unit 104 determines an effective image area from images captured by the image capture unit 103. The effective-image-area-coordinate storage unit 105 stores the coordinate data of the effective image area, determined by the effective-image-area determination unit 104.

The image control processor 106 scales up or down (enlarges or reduces) image data conveyed from the image capture unit 103, based on the coordinate data of the effective image area, stored in the effective-image-area-coordinate storage unit 105, and adjusts the display position. Signals delivered from the image control processor 106, serving as display signals, are forwarded to the display monitor 12 and displayed thereon.

The working memory 108 is provided for use by the A/D converter 101, the contrast controller 102, the image capture unit 103, the effective-image-area determination unit 104, and the image control processor 106. The lighting signal input unit 110 receives a lighting signal from the lighting controller 111.

Next, operations of the components will be described. The image processor 11 implements two types of processing: a determination process that determines an effective image area, and the routine that produces an image display signal of the effective image area based on coordinate information in an image effective area obtained by the determination. Only in situations where the lighting device is on, the determination process is implemented when triggered by an event as will be described later. The routine is executed at all times.

First, image signal flow and process flow in the determination process will be described with reference to FIGS. 1 and 2.

Figure 2:
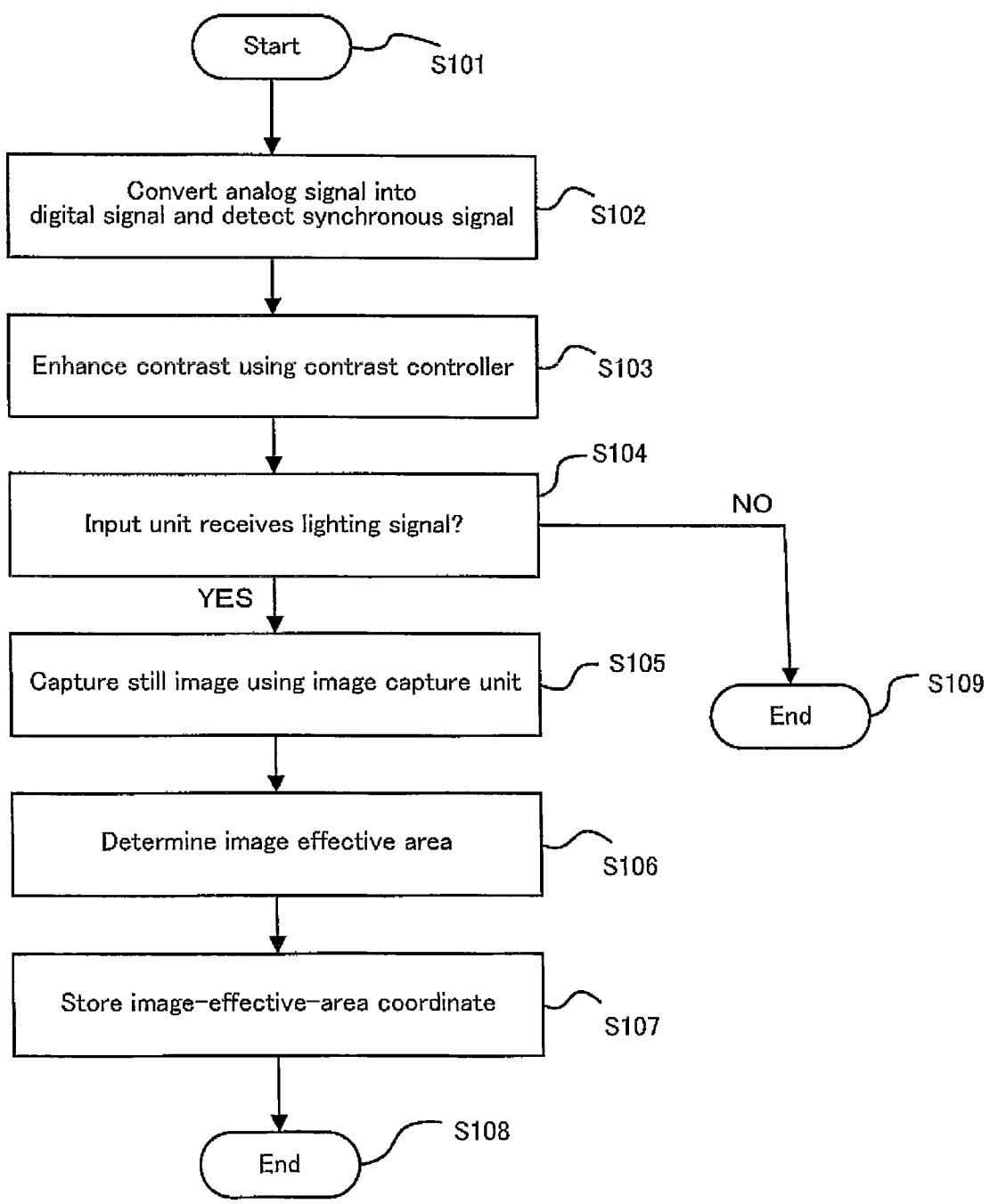
FIG. 2 is a flow diagram illustrating process flow for determination according to Embodiment 1 of the present invention.

FIG. 2 is a flow diagram illustrating process flow for the image signal in the determination process executed by the image processor 11 according to the present embodiment. The determination process can be initiated when it is triggered by the event, such as when a user depresses a button that is provided beforehand for determination process initiation, or when a predetermined period of time elapses after the synchronous signal detector has properly detected a vertical synchronous signal.

In step S102 of FIG. 2, upon initiation of the determination process, a television signal from the camera device 10 is converted with the A/D converter 101, and a synchronous signal is detected with the synchronous signal detector 107. Next, in step S103, the contrast of the A/D converted image signal is enhanced by the contrast controller; a black portion of the image signal is made blacker, and white portion thereof whiter. In step S104, it is ascertained whether the lighting signal input unit 110 has received a lighting signal from the lighting controller 111. If the lighting device is on, then process flow moves to step S105; if it is off, then the determination process ends. With this process, images that are taken by the camera device 10 when the determination process continues, result in camera images inside an illuminated elevator car. In this situation, if a synchronous signal has been detected with the synchronous signal detector 107, then it follows that the image processor 11 receives the camera images; the image capture unit 103 receives contrast-enhanced image data of a commonly taken camera image.

In step S105, the image capture unit 103 captures a still image in synchronization with a vertical synchronous signal. In step S106, using the still image, the boundary of an effective image area is determined. A method of determining the effective image area will be described referring to FIG. 3.

Figure 3:
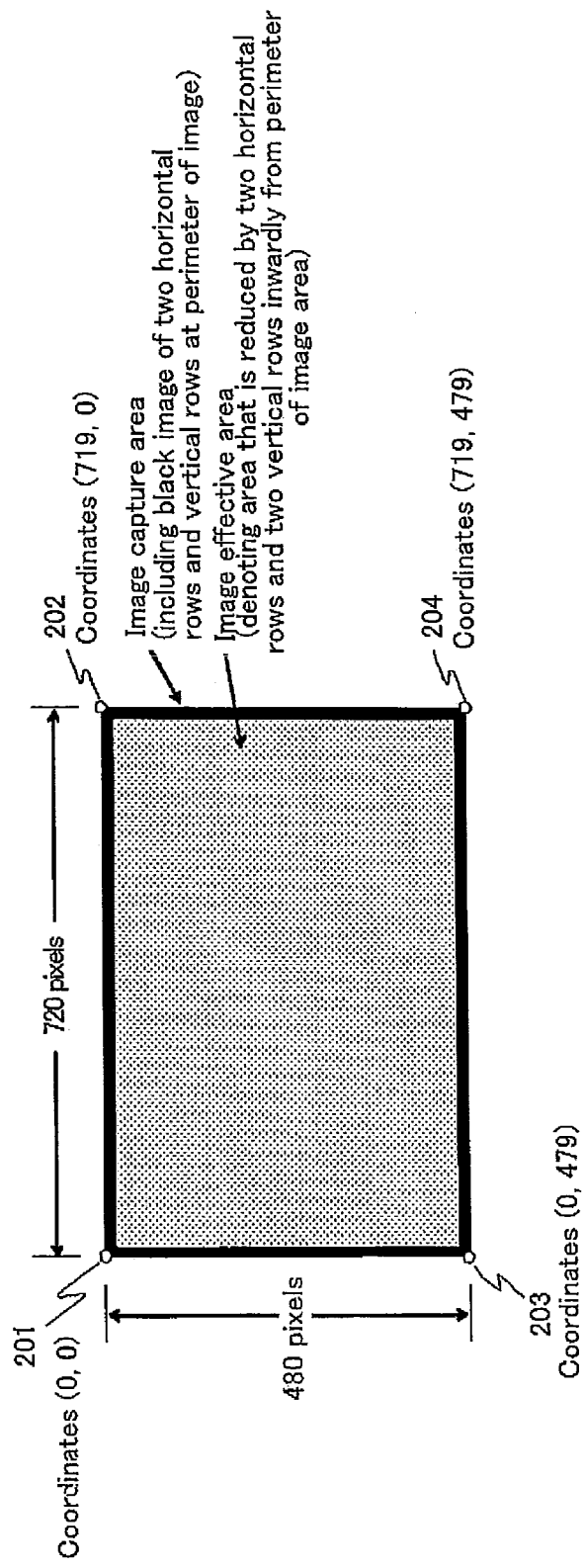
FIG. 3 is a view illustrating an example of capture image, according to Embodiment 1 of the present invention.

FIG. 3 is a view illustrating an example of an image to be captured with the image capture unit 103. Here, the number of pixels of the captured image is assumed to be 720×480, which is used for the typical television signal. Further, with respect to coordinates of the image, it is assumed that the upper left-hand corner, designated by numeral 201 in FIG. 3, is located at coordinates (0, 0); the upper right-hand corner by numeral 202 in FIG. 3, at coordinates (719, 0); the lower left-hand corner by numeral 203 in FIG. 3, at coordinates (0, 479); and the lower right-hand corner by numeral 204 in FIG. 3, at coordinates (719, 479).

Further, it is assumed that two uppermost horizontal rows of pixels in the image, two leftmost vertical rows thereof, two rightmost vertical rows thereof, and two lowermost horizontal rows thereof, represent a non-image area (black image). The non-image area indicates additional images produced in the camera device 10 in order to fit to a television signal the image from an image sensor mounted on the camera device 10, because the pixel number of the image of the image sensor is different from 720×480—typically used with the television signal. If the pixel number of the image sensor varies, then that of the non-image area varies. In this example, the pixel number of the image sensor is 716×476.

FIG. 4 is a view illustrating a memory map of memory data that an image capture unit has in a working memory for capturing images. Captured image data are sequentially stored in the memory, on a one-by-one pixel basis, rightward from coordinates (0, 0) of the image in FIG. 3. Data that represent an image, at coordinates (0, 0), are designated by numeral 251 in FIG. 4; data at coordinates (719, 0), by numeral 253; and data at coordinates (0, 1), by numeral 254.

Captured image data, when represented as a 16-bit color, are stored as 16-bit (2 byte) data per pixel. Since in the present embodiment, the case of 16-bit color will be described, representation in FIG. 4 is conveniently based on two bytes as well. Further, in 16-bit color, 0x000 represents black and 0xFFFF, white, and 16-bit data represent 65536 colors. Data at coordinates (2, 2), for instance, is represented as 0x5F3D (indicated at numeral 258 in the figure) in the memory map in FIG. 4, with non-black data being stored.

In the determination of the effective image area in step S106 of FIG. 2, the differentiation between the black area and the non-black area is made by searching the memory map data, as shown in FIG. 4, in which the image in FIG. 3 has been already stored as data.

Figure 5:
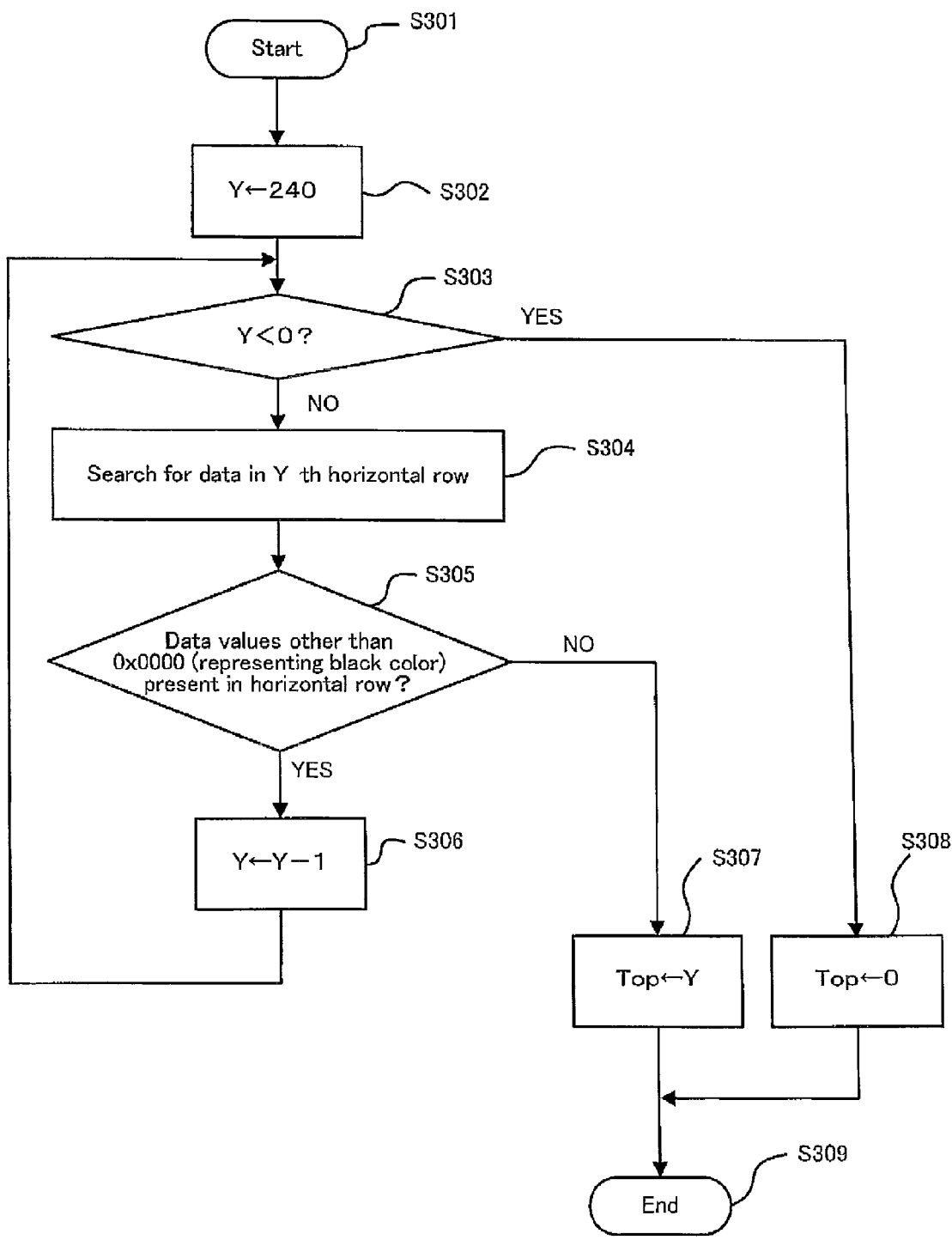
FIG. 5 is a flow diagram illustrating process flow for detecting an uppermost portion of an effective image area, according to Embodiment 1 of the present invention.
Figure 6:
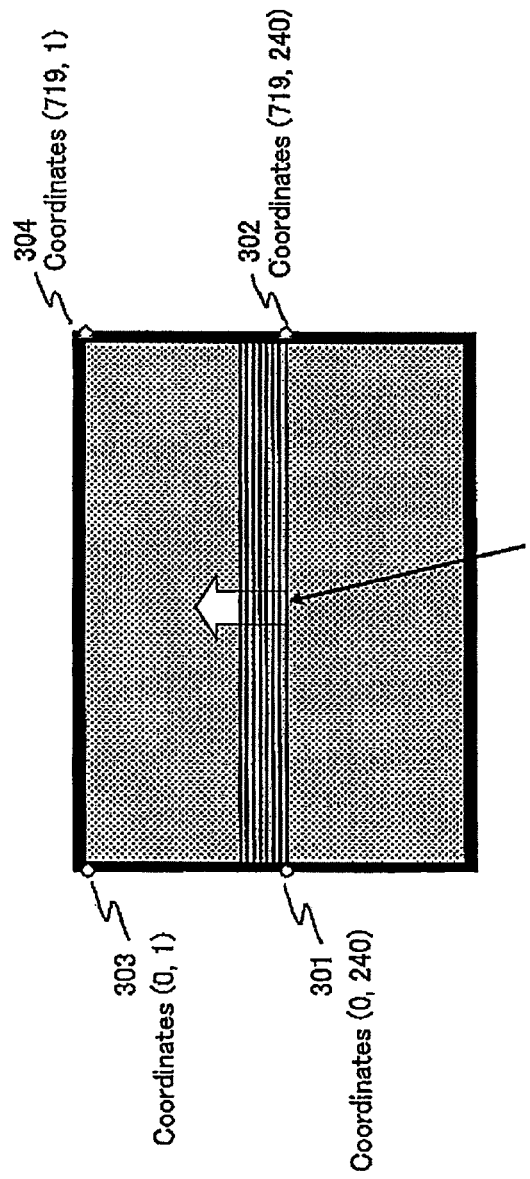
FIG. 6 is a view illustrating the process of detecting the uppermost portion of the effective image area, according to Embodiment 1 of the present invention.

A procedure of detecting the black area for the differentiation will be described below with reference to FIGS. 5 through 12. FIG. 5 is a flow diagram illustrating process flow for detecting an upper portion of the effective image area; FIG. 6 shows an example of an image for illustrating the process. Referring to FIG. 5, in step S302, a value of 240 is substituted for a variable Y. The variable Y, which refers to a coordinate variable in the vertical direction of the image, is set to a value of image center as an initial value thereof. Next, in step S303, it is ascertained whether Y<0; unless Y<0, then in step S304 all data in the Y-th horizontal row are searched. In other words, when Y is 240, a search is made on data in the memory map where the image data represented by a straight line between coordinates (0, 240), designated by numeral 301, and coordinates (719, 240), designated by numeral 302, has been already stored for the image coordinates as shown in FIG. 6. In step S305, it is ascertained whether data values other than 0x0000 are present in the horizontal row; if present, then it is determined that an effective image exists, and process flow proceeds to step S306. In step S306, Y−1 is substituted for Y, and process flow returns to step S303, with data in another horizontal row being searched again.

In step S303, if Y<0, then it is determined that "images are present" up to the uppermost portion of the image; in step S308, the uppermost portion (Top) of the effective image area is "zero." In the present case, as the image shown in FIG. 3, two uppermost horizontal rows of pixels in the image represent the black image. Because of this, when a search is made on pixel data in the horizontal row-represented by the straight line between coordinates (0, 1), indicated at numeral 303, and coordinates (719, 0) at numeral 304 in FIG. 6—it is determined in step S305 that "no data values except for 0x0000 are present in the horizontal row"; thus, in step S307, a value of one (1) is substituted for Top and then the uppermost portion of the effective image area is detected.

Figure 7:
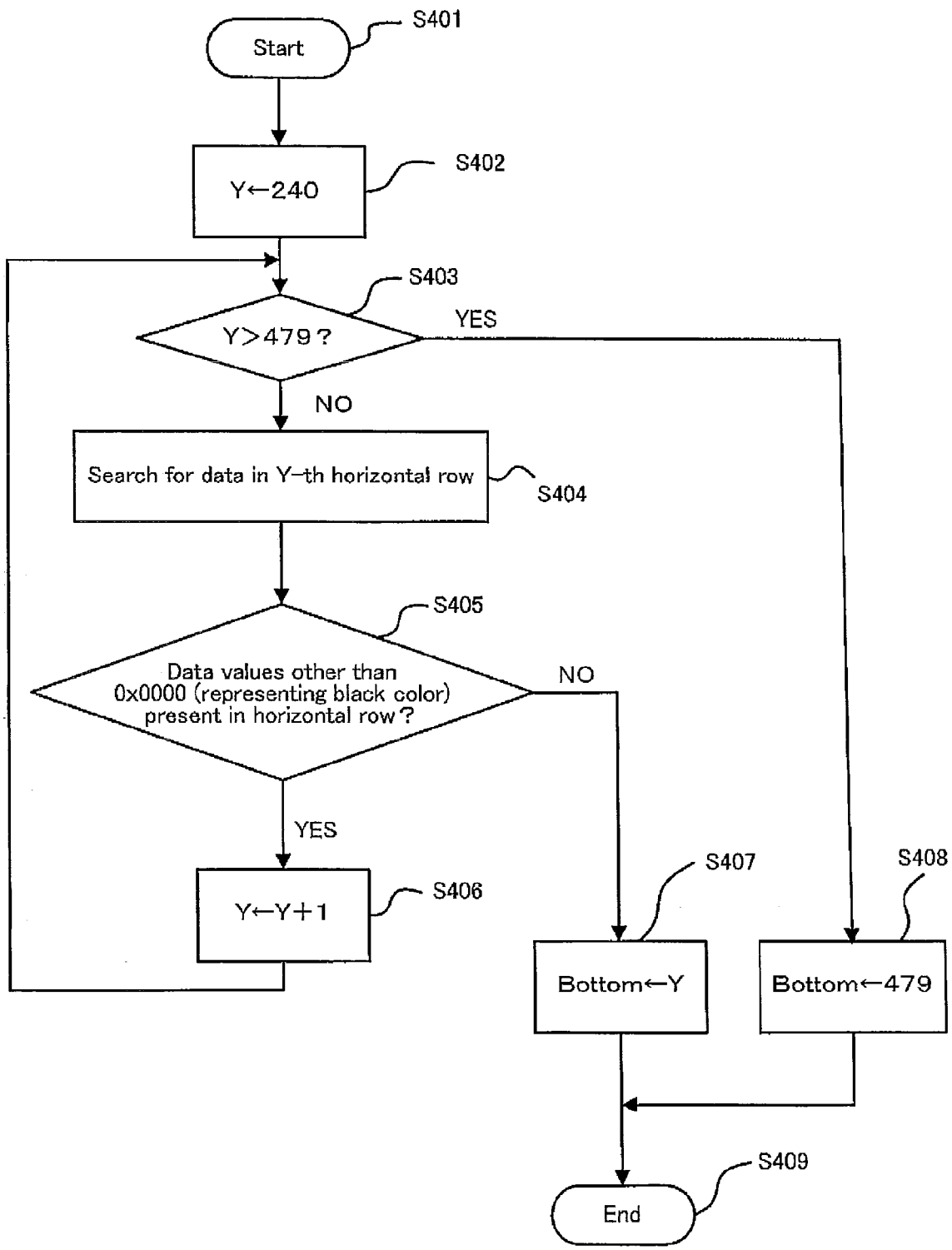
FIG. 7 is a flow diagram illustrating process flow for detecting a lowermost portion of the effective image area, according to Embodiment 1 of the present invention.
Figure 8:
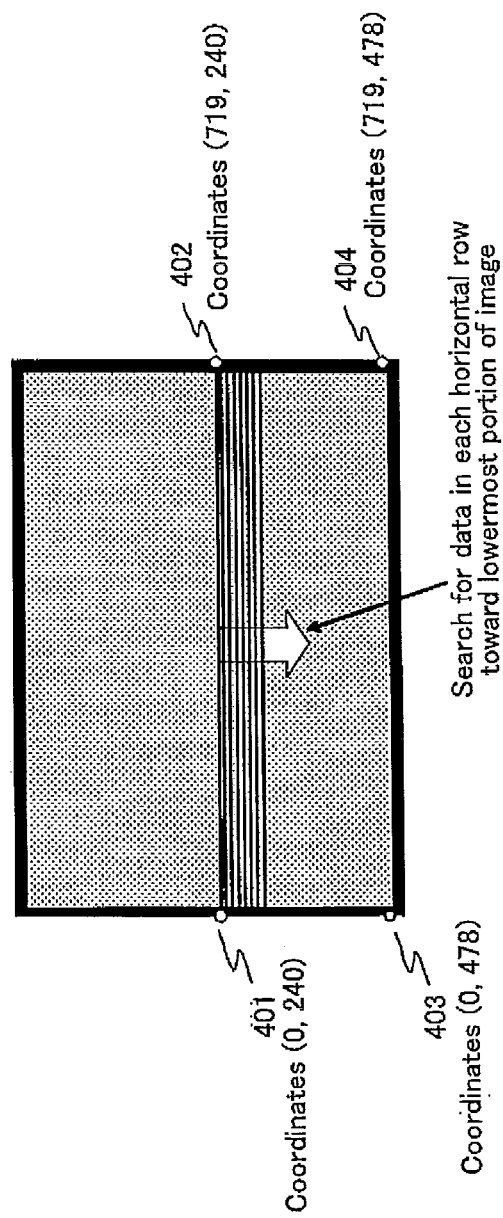
FIG. 8 is a view illustrating the process of detecting the lowermost portion of the effective image area, according to Embodiment 1 of the present invention.

Next, process of detecting the lowermost portion of the effective image area will be described below. FIG. 7 is a flow diagram illustrating process flow for detecting the lowermost portion of the effective image area; FIG. 8 shows an example of an image illustrating the process. Referring to FIG. 7, in step S402, the value of 240 is substituted for the variable Y. The variable Y, which refers to the coordinate variable in the vertical direction of the image, is set to the value of image center as an initial value thereof.

Next, it is ascertained in step S403 whether Y>479; unless Y>479, then all data in the Y-th horizontal row are searched in step S404. In other words, when Y is 240, a search is made on the memory map data where image data represented by a straight line between coordinates (0, 240), designated by numeral 401, and coordinates (719, 240), designated by numeral 402, has been already stored for the coordinates of image shown in FIG. 8. It is ascertained in step S405 whether data values other than 0x0000 are present in the horizontal row; if present, then it is determined that "an effective image is present," and process flow moves to step S406. In step S406, Y+1 is substituted for Y, process flow returns to step S403, and a search is made again on data in another horizontal row.

In step S403, if Y>479, then it is determined that "effective images are present" down to the lowermost portion of the image; in step S408, the lowermost portion (Bottom) of the effective image area is "479."

In the present case, as the image shown in FIG. 3, two lowermost horizontal rows of pixels in the image represent the black image. Because of this, when a search is made on data in the horizontal row—represented by the straight line between coordinates (0, 478), indicated at numeral 403, and coordinates (719, 478), at numeral 404, in FIG. 8—it is determined in step S405 that "no data values except for 0x0000 are present in the horizontal row"; thus, a value of 478 is substituted for Bottom in step S407, so that the lowermost portion of the effective image area is detected.

Figure 9:
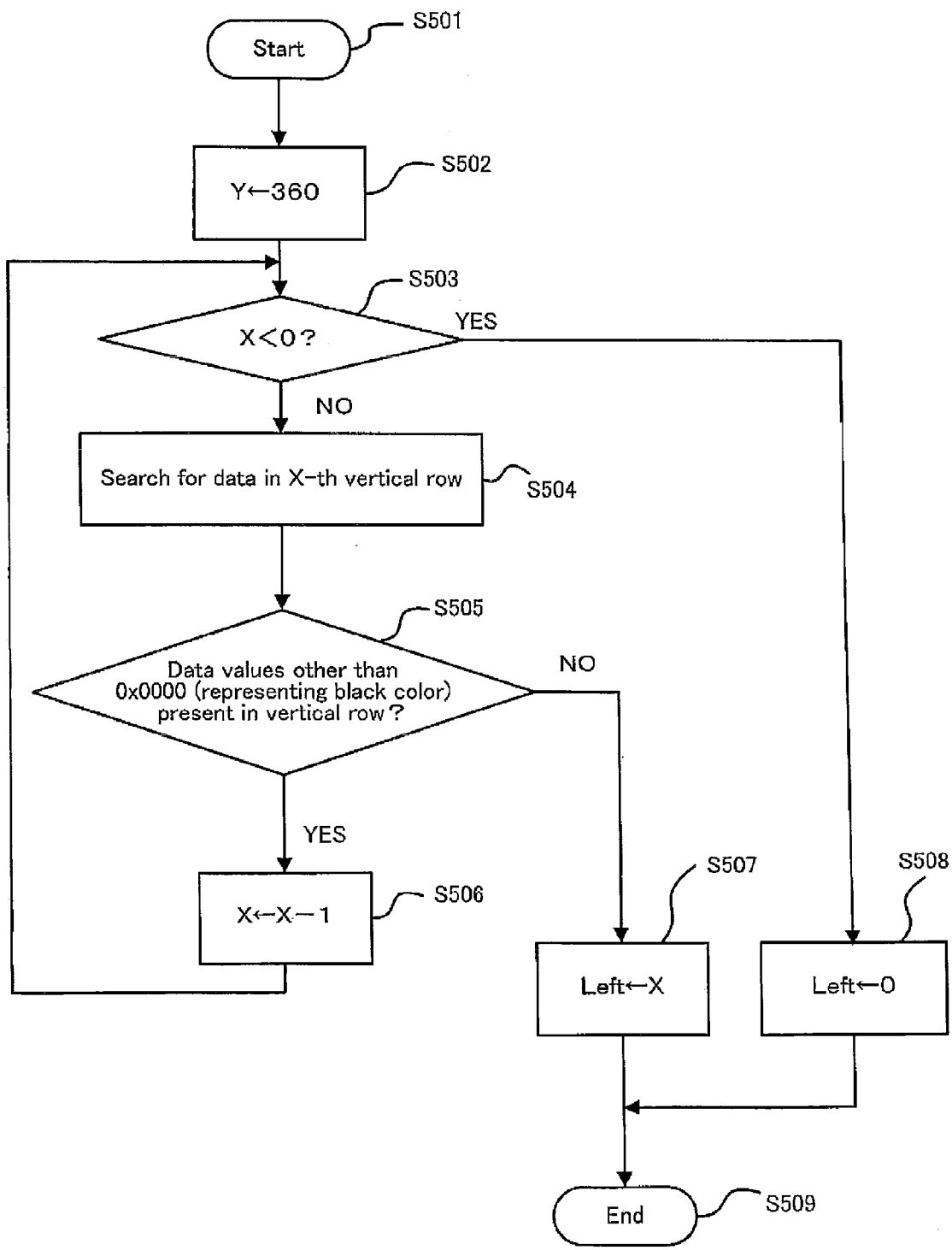
FIG. 9 is a flow diagram illustrating process flow for detecting a leftmost portion of the effective image area, according to Embodiment 1 of the present invention.
Figure 10:
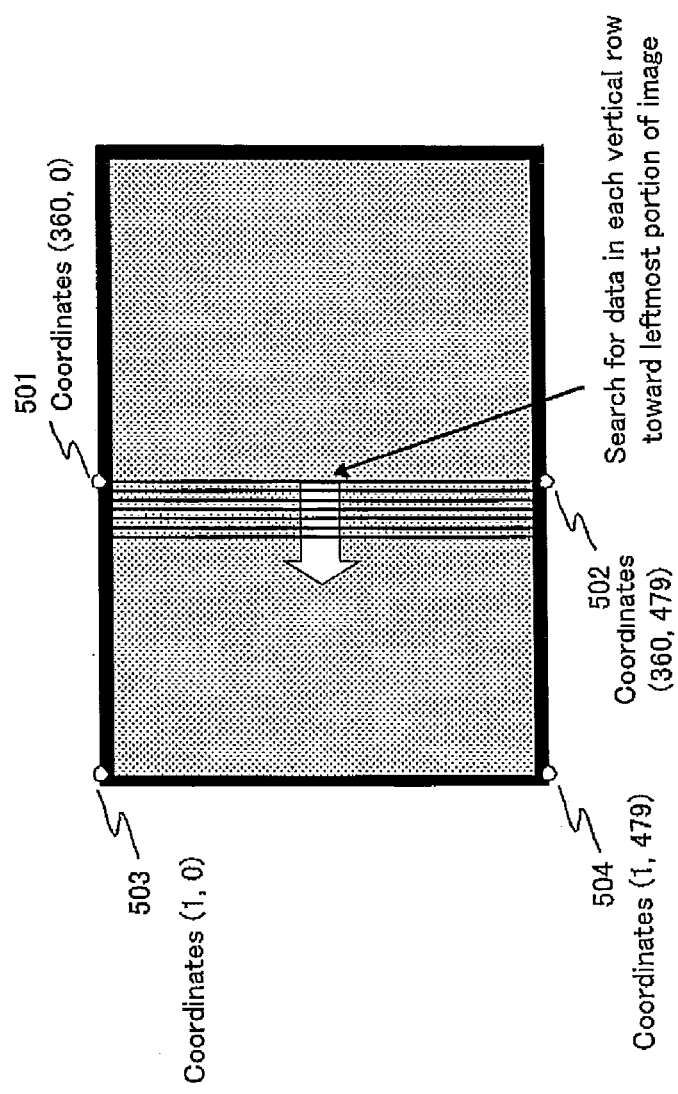
FIG. 10 is a view illustrating the process of detecting the leftmost portion of the effective image area, according to Embodiment 1 of the present invention.

Next, process of detecting the leftmost portion of the effective image area will be described below. FIG. 9 is a flow diagram illustrating process flow for detecting the leftmost portion of the effective image area; FIG. 10 shows an example of an image for illustrating the process. Referring to FIG. 9, in step S502, a value of 360 is substituted for a variable X. The variable X, which refers to a coordinate variable in the horizontal direction of the image, is set to a value of image center as an initial value thereof. Next, it is ascertained in step S503 whether X<0. Unless X<0, then all the data in the X-th vertical row are searched in step S504. In other words, when X is 360, a search is made on the memory map data where image data represented by a straight line between coordinates (360, 0), indicated at numeral 501, and coordinates (360, 479), at numeral 502, are already stored for the coordinates of image shown in FIG. 10. It is ascertained in step S505 whether data values other than 0x0000 are present in the vertical row; if present, determination is made as "an effective image is present," and then process flow moves to step S506. In step S506, X−1 is substituted for X, and then process flow returns to step S503, with data in another vertical row being searched again.

In step S403, if X<0, then it is determined that "images present" up to the leftmost portion of the image; in step S508, the leftmost portion (Left) of the effective image area is "0." In the present case, as the image shown in FIG. 3, two leftmost vertical rows of pixels in the image represent the black image. Because of this, when a search is made on data in the vertical row—represented by the straight line between coordinates (1, 0), indicated at numeral 503, and coordinates (1, 479), at numeral 504, in FIG. 10—it is determined in step S505 that "no data values except for 0x0000 are present in the vertical row"; thus, in step S507, a value of one is substituted for Left and then the leftmost portion of the effective image area is detected.

Figure 11:
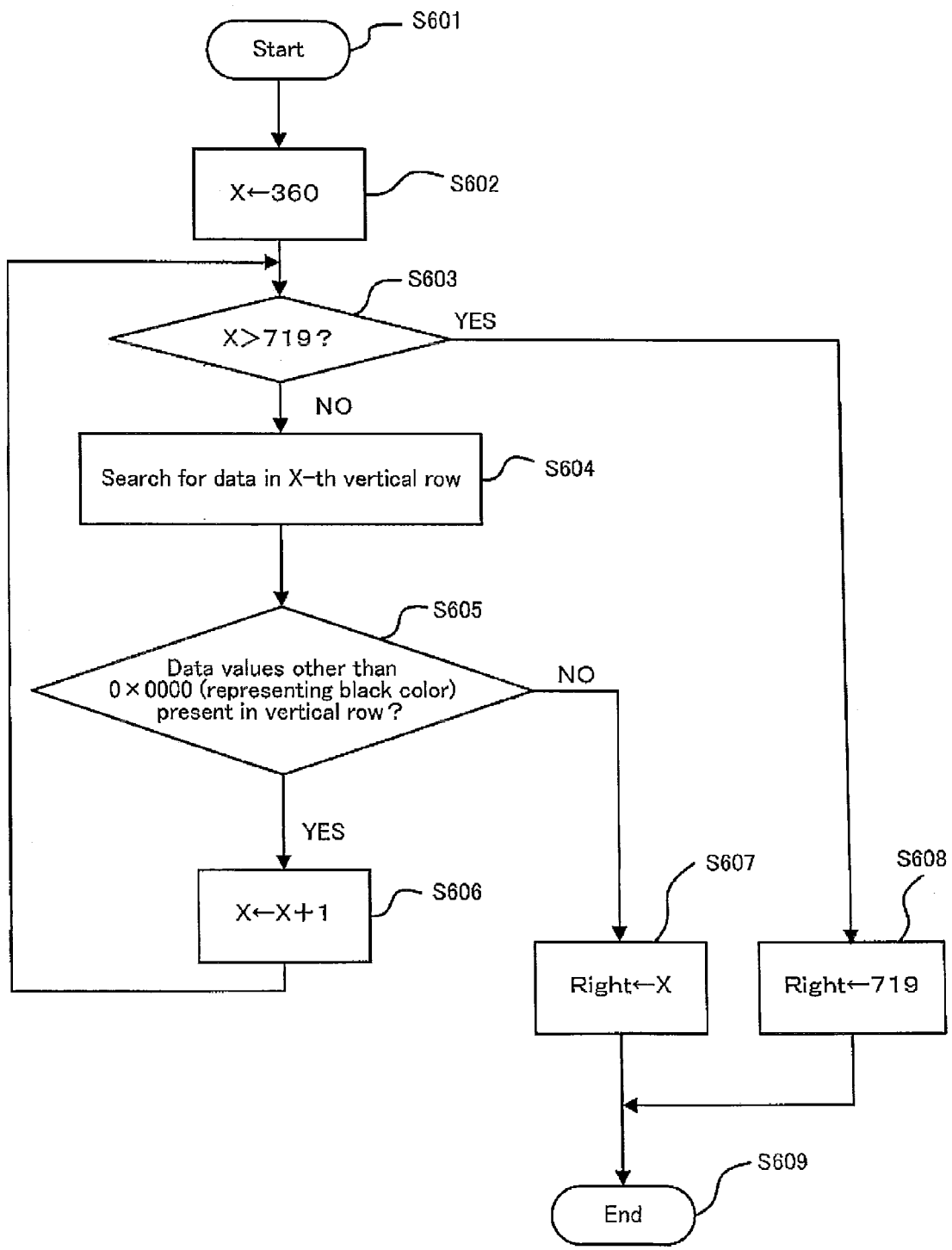
FIG. 11 is a flow diagram illustrating process flow for detecting a rightmost portion of the effective image area, according to Embodiment 1 of the present invention.
Figure 12:
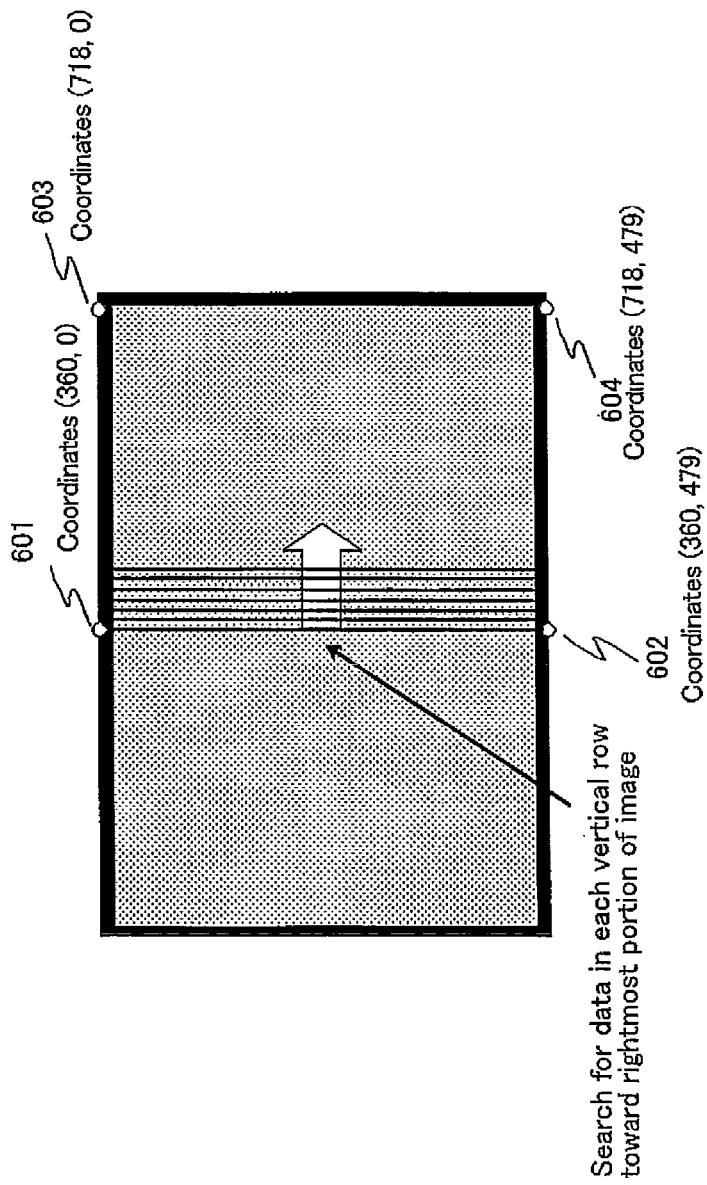
FIG. 12 is a view illustrating the process of detecting the rightmost portion of the effective image area, according to Embodiment 1 of the present invention.

Next, the process of detecting the rightmost portion of the effective image area will be described below. FIG. 11 is a flow diagram illustrating process flow for detecting the rightmost portion of the effective image area; FIG. 12 shows an example of an image for illustrating the process. Referring to FIG. 11, in step S602, the value of 360 is substituted for the variable X. The variable X, which refers to the coordinate variable in the horizontal direction of the image, is set to the value of image center as an initial value thereof. Next, it is ascertained in step S603 whether X>719. Unless X>719, then all the data in the X-th vertical row are searched in step S504. In other words, when X is 360, a search is made on data in the memory map where image data represented by a straight line between coordinates (360, 0), indicated at numeral 601, and coordinates (360, 479), at numeral 602, are already stored for the coordinates of image shown in FIG. 10. It is ascertained in step S605 whether data other than 0x0000 are present in the vertical row; if it is present, then determination is made as "an effective image is present," and process flow moves to step S606. In step S606, X+1 is substituted for X, and then process flow returns to step S603, with data in another the vertical row being searched again.

In step S603, if X>719, then it is determined that "effective images are present" up to the rightmost portion of the image; in step S608, the rightmost portion (Right) of the effective image area is "719." In the present case, as the image shown in FIG. 3, two rightmost vertical rows of pixels in the image represent the black image. For this reason, when a search is made on pixel data in the vertical row—represented by the straight line between coordinates (718, 0), designated by numeral 603, and coordinates (718, 479), by numeral 604, in FIG. 12—it is determined in step S605 that "no data values except for 0x0000 are present in the vertical row"; thus, in step S607, a value of 718 is substituted for Right and then the rightmost portion of the effective image area is detected.

In this way, the uppermost, lowermost, leftmost, and rightmost portions of the effective image area are detected and determined, which terminates the determination of the effective image area in step S106 in FIG. 2. Next, in step S107, the effective image area coordinate storage unit 105 stores the coordinates of the effective area.

In an example of the image as shown in FIG. 3, two uppermost horizontal rows of pixels in the image, two leftmost vertical rows thereof, two rightmost vertical rows thereof, and two lowermost horizontal rows thereof, represent the black image; thus, in determination of the above-described effective image area, values of 1, 478, 1 and 718 are stored as Top, Bottom, Left and Right, respectively. This terminates the determination process.

Here, only the case where data values represent 0x0000 is determined as the black image. Considering a noise signal contained in the television signal, a threshold value is set to a value close to 0x0000. Using the threshold value, data values close to 0x0000 could be determined as the black image. Further, when searching pixel data in each horizontal row and vertical row, determination may be made as the black image by using the average value of each of data for a single horizontal row and a single vertical row.

Figure 13:
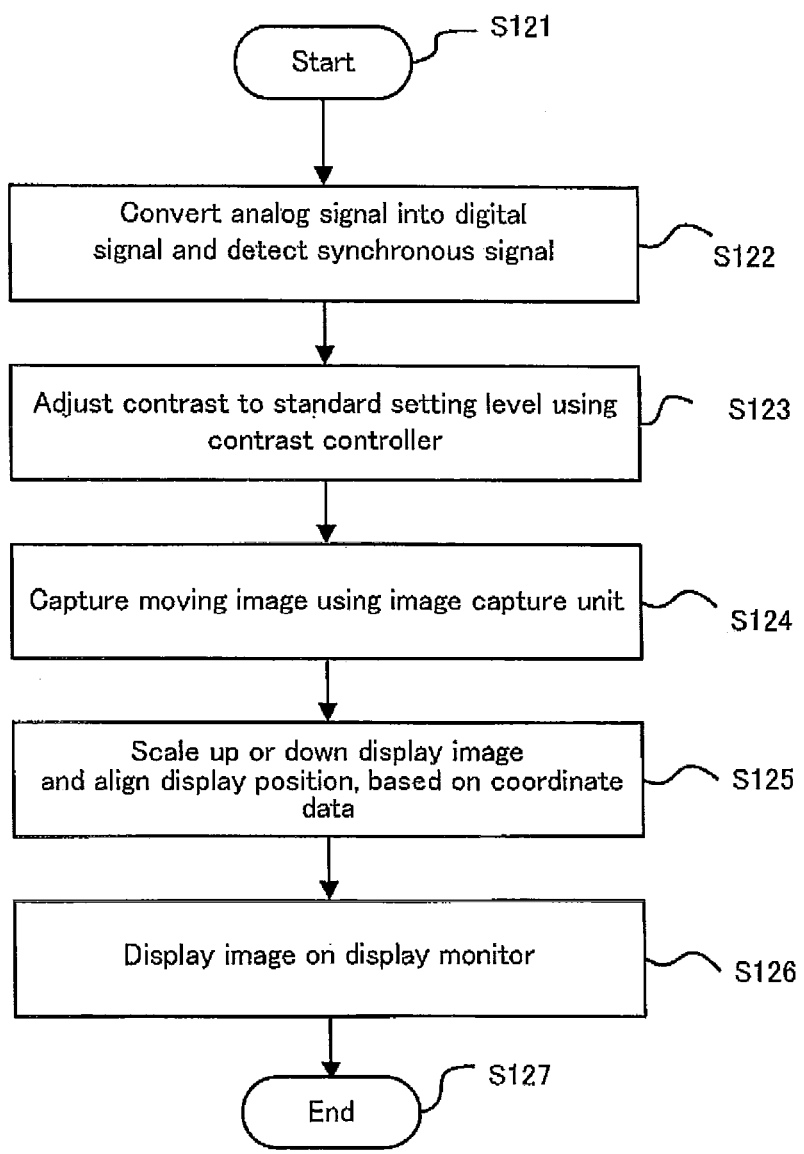
FIG. 13 is a flow diagram illustrating process flow for an image signal in the routine, according to Embodiment 1 of the present invention.

Next, the routine will be described below. FIG. 13 is a flow diagram depicting process flow for the routine. The routine will be described below referring to FIGS. 1 and 13. It is assumed that the effective-image-area-coordinate determination unit 105 has already completed the determination process, and stored the coordinates of the effective image area.

First, in step S122 in FIG. 13, the television signal from the camera device 10 is A/D converted with the A/D converter 101 into the digital signal, and the synchronous signal is detected with the synchronous signal detector 107. In step S123, the contrast is adjusted to the standard setting level using the contrast controller 102. Next, in step S124, the image capture unit 103 captures an image in synchronization with a vertical synchronous signal. The determination process captures a single still image, while the routine sequentially captures a series of still images that form a motion video image.

Next, in step S125, based on the coordinates of the effective image area stored in the effective-image-area-coordinate storage unit 105, the image control processor 106 scales up or down (enlarges or reduces) images captured with the image capture unit 103, and adjusts the display position.
In this moment, the image scaling up or down (enlargement or reduction) and display position adjustment are made based on the pixel numbers in the horizontal row and the vertical row of the monitor 12 screen on which the image is displayed.

Figure 14:
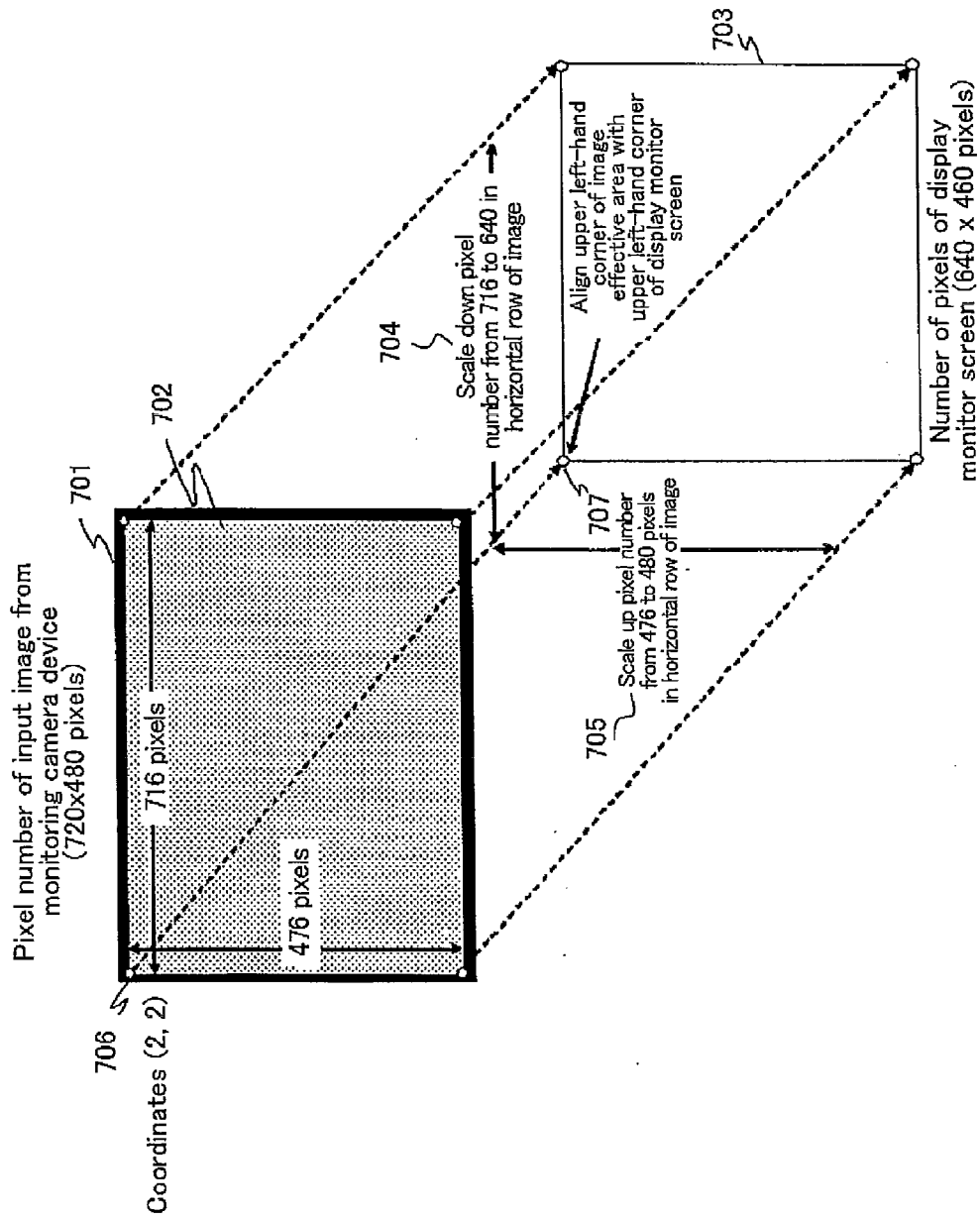
FIG. 14 is a view illustrating an example of processing of the image control processor, according to Embodiment 1 of the present invention.

An example of a process implemented by the image control processor 106—when the image in FIG. 3 illustrating an example of the above-described determination process is displayed on the monitor whose pixel number in the horizontal row and the vertical row, is set to 640×480, for example—will be described with reference to FIG. 14. Referring to FIG. 14, the pixel number of the image received from the camera device 10 in FIG. 1 is 720×480 (a portion indicated by numeral 701 in the figure). An area determined as an effective image area corresponds to an area that is reduced by a single horizontal row or vertical row inwardly from each coordinate (Top=1, Bottom=478, Left=1, Right=718) of the effective image area stored in the effective-image-area-coordinate storage unit 105—i.e., 716 pixels from second to 717th one in the horizontal row, and 476 pixels from second to 477th vertical row, correspond to the effective image area (a portion as indicated by numeral 702 in the figure).

On the other hand, the number of pixels in the horizontal row and vertical row of the monitor 12, is 640×480 (a portion as indicated at numeral 703 in the figure); thus, the pixel number in the horizontal row thereof is scaled down from 716 to 640 (a portion as indicated at numeral 704 in the figure), and the pixel number in the vertical row thereof is scaled up from 476 to 480 (a portion as indicated by numeral 705 in the figure).

Further, the display position is adjusted so that the upper left-hand corner coordinates in the effective image area coincide with the upper left-hand corner coordinates of the monitor screen. In an example shown in FIG. 14, images displayed after alignments are made such that coordinates (2, 2) of the upper left-hand corner in the effective image area (the position of a point as designated by numeral 706 in the figure) coincide with coordinates (0, 0) of the display monitor (the position of a point as designated by numeral 707 in the figure).

With this arrangement, an image produced by removing the black area from the image taken by the camera device can be displayed on the display monitor.

When the non-image area is created owing to a difference in the pixel number between the television signal and the image sensor of the camera device, adjustments of the display size and position are automatically made, thus allowing for alleviation of the burden of a camera device installation technician. Likewise, the burden of a maintenance technician can be reduced.

The case where the black area additionally provided by the camera device is eliminated is described in the present embodiment. Also eliminated is another black area created, depending on the camera device installation condition, owing to an object entering the camera's field of vision in such a manner that any side of the taken image is blocked. This eliminates a useless area displayed on the monitor 13, thereby permitting an effective use of the screen of the monitor 13.

In particular, enhancement of the image contrast with the contrast controller 102 facilitates elimination of the useless area, thus leading to a more effective use of the screen of the monitor 13.

Further, even though the installation position of the monitoring camera device causes a black area to be taken owing to an object entering the camera's field of vision, the black area of the image taken by the camera device is detected using the camera images and is avoided from being displayed on the monitor, thus allowing a high degree of flexibility in installation of the camera device.

Embodiment 2

Figure 15:
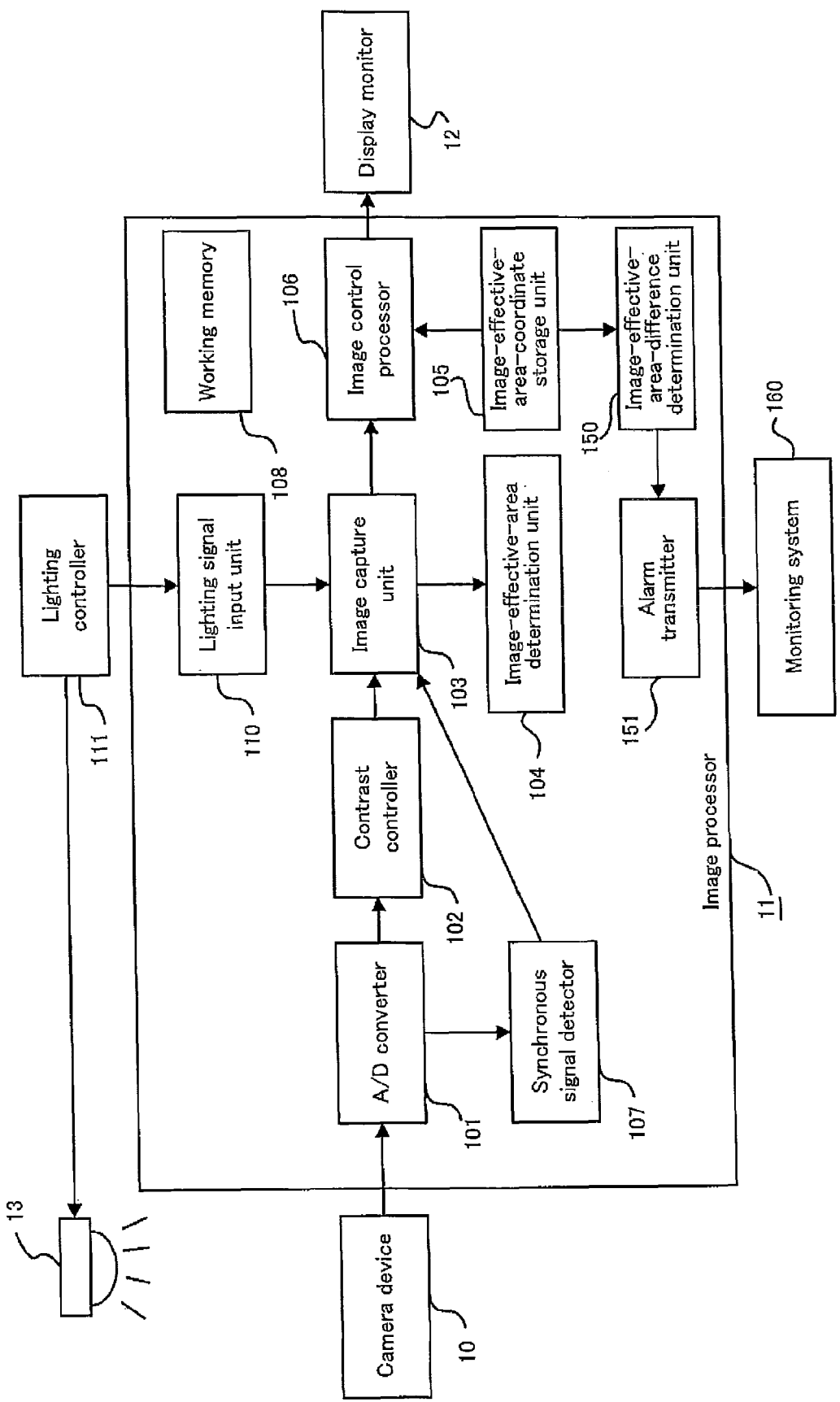
FIG. 15 is a block diagram illustrating a configuration of an elevator security camera-based monitoring system according to Embodiment 2 of the present invention.

FIG. 15 is a view illustrating a security camera-based monitoring system according to Embodiment 2 of the present invention. The configuration of the present embodiment is substantially similar to that of the security camera-based monitoring system according to Embodiment 1 as shown in FIG. 1; like reference numerals refer to like components in FIGS. 1 and 15, and description of the like components will not be provided herein. The differences between both systems are that an effective-image-area-difference determination unit 150 and an alarm transmitter 151 are additionally provided to the image processor 11, and the system of the present embodiment includes a monitoring system 160 that is connected through the alarm transmitter 151 and via a network to the image processor 11. The monitoring system 160 is connected via a network to a building management/security office and a security company, and exchanges security information with both parties.

Next, operation of the system will be described below. In Embodiment 1, a case is shown in which the determination process is initiated when it is triggered by an event, such as when a user depress a press-button that is preliminarily provided for initiation of the determination process, or when a predetermined period of time elapses after the synchronous signal detector has started properly detecting a vertical synchronous signal. In Embodiment 2, the process is started by an event occurring at regular intervals, for instance, every five seconds.

The effective-image-area-difference determination unit 150 records the coordinate data stored in the effective-image-area-coordinate storage unit 105, every time that the determination process as described in Embodiment 1 is implemented, detects the difference and then analyzes the variation in the effective image area. When there occurs a predetermined variation in the coordinates of the effective image area that are recorded for every determination process, a coordinate variation signal is delivered to the alarm transmitter 151. The alarm transmitter 151 sends an alarm/alert signal to, for example, a monitoring system 160 that is connected therewith by way of the network. The monitoring system 160 that has received the alarm/alert signal notifies a faulty condition to the building management/security office or the security company.

The extent of coordinate variation in the effective image area based on which the effective-image-area-difference determination unit 150 produces an output coordinate variation signal, may be determined according to a security level, or an environment condition in which the camera device is used. A coordinate variation signal may be arranged to be generated when the difference of one pixel is detected, or when the difference of a predetermined threshold value or more is detected.

As discussed this far, a display system according to the present embodiment allows the variation in the non-image area of the monitoring camera device to be detected, which thus enables detection of the faulty camera device, or the occurrence of an faulty condition in picture-taking, such as when a cover is placed over the camera device.

In particular, the alarm/alert signal transmitted from the alarm transmitter 151 enables the building management/security office or the security company to be readily informed as to the faulty condition associated with the camera device, which can help assure the reliability of the monitoring system. While the present invention has been shown and described with reference to preferred embodiments thereof, it will be understood by those skilled in the art that various modifications and the like could be made thereto without departing from the spirit and scope of the invention.

What is claimed is:

1. A display system comprising:
   a camera device that takes an image of an area illuminated by a lighting device, to produce a motion video image as an output;
   an image capture unit configured to:
      during an effective-image-area determination process, capture a single still image from the motion video image in response to an output signal generated by the lighting device when the lighting device is on, and
      during a monitoring routine, sequentially capture a series of still images forming the motion video image;
   an effective-image-area determination unit that performs the following during the effective-image-area determination process:
      receives the captured single still image,
      determines an effective image area of the captured single still image,
      calculates coordinate data indicative of the determined effective image area, and
      stores the calculated coordinate data;
   a storage unit into which said effective-image-area determination unit stores the calculated coordinate data indicative of the effective image area during the effective-image-area determination process; and an image control processor that performs the following during the monitoring routine:

accesses the storage unit in order to extract therefrom the stored coordinate data calculated by said effective-image-area determination unit during the effective-image-area determination process, scales up or down the effective image area of each of the sequentially captured series of still images, according to the extracted stored coordinate data and a display area of a display monitor device.

2. The display system of claim 1, further comprising:
a contrast controller that enhances a contrast of the motion video image produced by the camera device, interposed between the camera device and the image capture unit.

3. The display system of claim 1, wherein the camera device takes an image in an elevator car.

4. The display system of claim 2, wherein the camera device takes an image in an elevator car.

5. The display system of claim 1, further comprising:
an effective-image-area difference determination unit that detects a variation in the effective image area.

6. The display system of claim 2, further comprising:
an effective-image-area difference determination unit that detects a variation in the effective image area.

7. The display system of claim 3, further comprising:
an effective-image-area difference determination unit that detects a variation in the effective image area.

8. The display system of claim 4, further comprising:
an effective-image-area difference determination unit that detects a variation in the effective image area.

9. The display system of claim 5, wherein an alarm is generated when the variation in the effective image area is above a given level.

10. The display system of claim 6, wherein an alarm is generated when the variation in the effective image area is above a given level.

11. The display system of claim 7, wherein an alarm is generated when the variation in the effective image area is above a given level.

12. The display system of claim 8, wherein an alarm is generated when the variation in the effective image area is above a given level.

13. The display system of claim 1, wherein the effective-image-area determination unit searches for a black area in the captured still image starting from an image center toward an uppermost, lowermost, leftmost, or rightmost portion of the captured still image on a line-to-line basis, in order to determine the effective image area in the captured still image.

* * * * *